United States Patent [19]

Kurrle

[11] Patent Number: 5,411,639
[45] Date of Patent: May 2, 1995

[54] PROCESS FOR ENHANCING SIZING EFFICIENCY IN FILLED PAPERS

[75] Inventor: Frederick L. Kurrle, Laurel, Md.

[73] Assignee: Westvaco Corporation, New York, N.Y.

[21] Appl. No.: 136,265

[22] Filed: Oct. 15, 1993

[51] Int. Cl.⁶ .......................................... D21H 17/69
[52] U.S. Cl. .................................. 162/175; 162/179; 162/181.2; 162/183
[58] Field of Search .................... 162/179, 175, 181.2, 162/183

[56] References Cited

U.S. PATENT DOCUMENTS

| | | | |
|---|---|---|---|
| 3,392,085 | 7/1968 | Oliver | 162/175 |
| 3,630,830 | 12/1971 | Herdle et al. | 162/175 |
| 4,591,412 | 5/1986 | Hechler | 162/181.8 |
| 5,147,507 | 9/1992 | Gill . | |

OTHER PUBLICATIONS

"Diagnostic Sizing Loss Problem Solving in Alkaline Systems", by B. M. Moyers, 1991 Tappi Journal, pp. 425–432.

"The Interactions of Alkyl Ketene Dimer With Other Wet-End Additives", by A. R. Colasurdo and I. Thorn, Tappi Journal, Sep. 1992, pp. 143–149.

"A Precipitated Starch Product", by C. C. Kesler and W. C. Black, Pulp & Paper Feb. 16–19, 1942, pp. 291–294.

Primary Examiner—Peter Chin

[57] ABSTRACT

A papermaking process with improved sizing efficiency and reduced size reversion is characterized by the use of a calcium carbonate pigment which is surface treated with an anionic starch-soap complex. The starch-soap complex is precipitated onto the pigment surfaces to provide bonding sites for sizing agents which impart water repellency to the paper. The sizing agents become bound to the starch component of the starch-soap complex to yield more reacted size in paper webs formed from the furnish than would be present without the use of the treated pigment. The use of the surface treated pigment also allows the papermaker to increase the filler content of the paper without sacrificing dry strength properties.

12 Claims, 1 Drawing Sheet

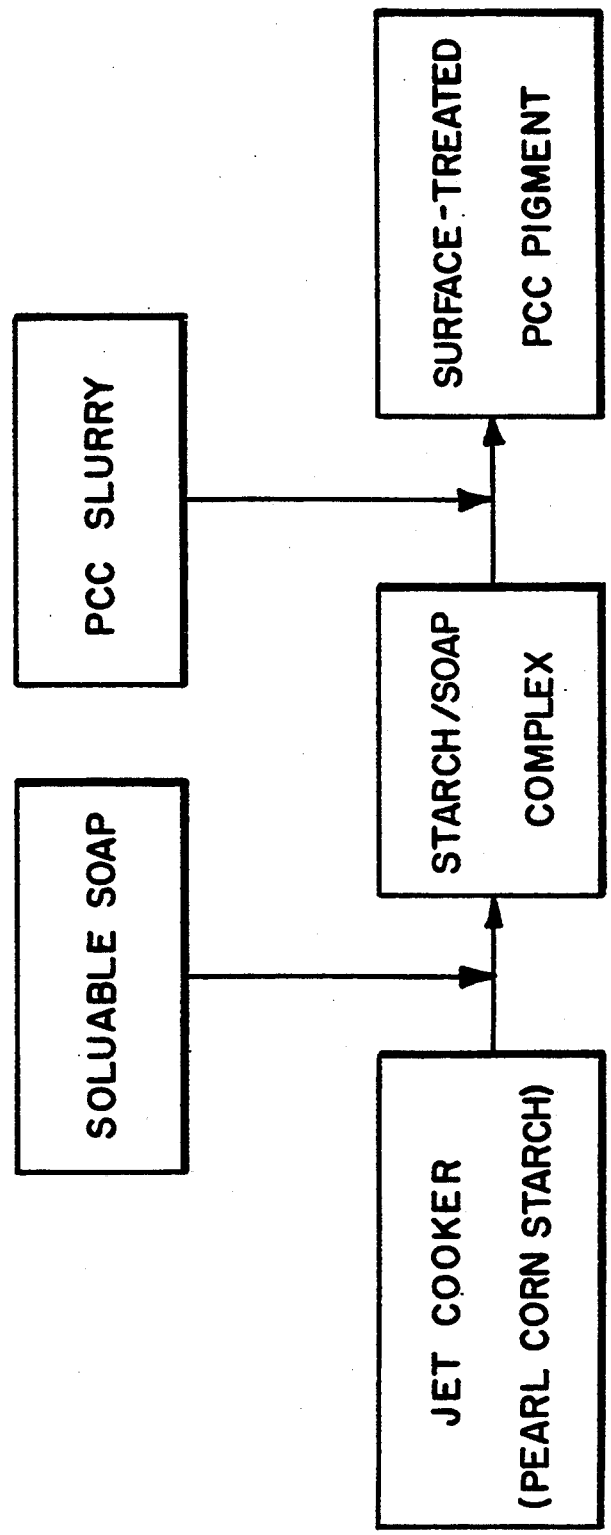

PROCESS FOR ENHANCING SIZING EFFICIENCY IN FILLED PAPERS

BACKGROUND OF INVENTION

Increasing the filler content of paper can provide the papermaker with numerous benefits, including savings in the cost of raw materials, improved optical properties, and better print quality. There are, however, limits to the amount of filler that can be substituted for papermaking fiber. At high filler contents, paper can suffer losses in strength, stiffness and sizing. All commonly used untreated fillers (e.g. clay, titanium dioxide, calcium carbonate) are known to have a detrimental effect on strength and sizing. Increasing the concentration of filler in conventional papermaking furnishes results in increased size demand to maintain the desired degree of water repellency in the finished paper. This is because a disproportionate fraction of the size is adsorbed on the high surface area filler in the furnish. This adsorbed size may be lost from the furnish due to poor retention, or more likely, the increased sizing demand is due to the manner in which the size becomes attached on the conventional high surface area filler components. This link is not permanent and does not contribute significantly to the paper's hydrophobicity. Thus the effectiveness of the size is reduced which results in an increase in sizing demand (see article entitled "Diagnostic Sizing Loss Problem Solving in Alkaline Systems", B. M. Moyers, 1991 TAPPI Papermakers Conference Proceedings, pages 425–432).

In particular, poor sizing efficiency and loss of water repellency over time (size reversion) are problems associated with the use of alkyl ketene dimer (AKD) and alkenyl succinic anhydride (ASA) sizing agents and calcium carbonate pigments, particularly in highly filled alkaline papers. These problems are generally accentuated when filler levels approach and exceed about 20%. In addition, strength properties decrease as filler levels increase, impacting negatively on converting operations and end use functionality. Thus, in circumstances where increasing filler content would be advantageous, associated sizing problems have occurred affecting paper quality, machine performance and runnability.

The mechanism by which permanent AKD sizing is imparted to alkaline papers is generally agreed to include the retention, distribution and anchoring of the size with proper molecular orientation onto the cellulose fibers. There has been some controversy as to the anchoring mechanism itself and whether or not a covalent bond is formed between cellulose hydroxyl groups and the lactone ring of the AKD molecule. Sizing losses over time have been attributed to interference on the molecular level by wet end additives and contaminants, as well as AKD/pigment interactions and the effects of AKD hydrolysis products. These results are reported for instance in the article entitled "The Interactions of Alkyl Ketene Dimer with other Wet-End Additives", by A. R. Colasurdo and I. Thorn, TAPPI Journal, September 1992, pages 143–149.

AKD sizing agents are basically waxes with relatively low melting points (approximately 115° F.). Their fluidity increases as sheet drying temperatures increase. According to accepted theory, once the size is retained in the sheet matrix, the sub-micron particles melt and spread over fiber and filler surfaces during the drying process before reacting with the cellulose fibers.

Efforts by others to reduce the sizing demand of filled papers include the invention disclosed in U.S. Pat. No. 5,147,507. This patent teaches a method for improving papermaking with the use of a calcium carbonate pigment modified by surface treatment with a cationic polymer. A polymer of the type used is sold under the tradename HERCON. In fact, HERCON is a tradename for a reactive size material. Thus, the '507 patent teaches a process whereby a reactive size is associated directly with the calcium carbonate pigment. The result is alleged to improve the papermaking process by reducing the usage of wet end sizing agent, improving opacity, improving filler retention and causing better drainage on the papermachine. However when used according to the patent, the surface treated pigment is combined with synthetic sizing agents such as AKD or ASA which results in the use of more sizing agent than would be required according to the present invention. In addition, the treatment specified in the '507 patent is more expensive than the process of the present invention.

SUMMARY OF INVENTION

In accordance with the present invention, a process has been developed for producing a modified pigment for improved sizing efficiency. The invention relates in general to a treatment for inorganic calcium carbonate pigments and the use of the treated pigments in a papermaking process. More specifically, the invention relates to both precipitated (PCC) and ground (GCC) calcium carbonate pigments which have been surface treated with a starch-soap complex. The specific morphologies of PCC that have been found to be useful in the practice of the present invention include the scalenohedral, rhombohedral and acicular forms. The pigment modification is achieved by complexing a fully cooked corn or potato starch with a soluble soap. The starch-soap complex is then mixed with a calcium carbonate pigment slurry where the starch-soap complex is precipitated on the pigment surfaces. This reaction takes place by displacement of sodium by calcium ions in the pigment slurry. The benefits of the surface treatment are manifested in improved sizing efficiency, reduced size reversion and increased dry strength properties when the surface treated pigment is incorporated in a conventional alkaline papermaking furnish. Unlike an untreated pigment, the treated pigment of the present invention provides sites for bonding sizing agents with proper molecular orientation so that they remain available to contribute to the hydrophobicity of paper made from the paper making furnish. Scalenohedral forms of PCC surface treated with the starch-soap complex surprisingly produce an increase in water repellency as filler loadings increase at the same size addition. With rhombohedral forms of PCC, the sizing values remain constant as filler loadings increase. These findings are based on the use of an industry standard Hercules size test (HST). All other forms of ground and precipitated calcium carbonate pigments show improvement in HST values as compared with papers containing untreated control pigments.

The starch-soap complex of the present invention is precipitated onto the pigment surfaces in the presence of ions which make the soap insoluble. A related product is disclosed in a paper entitled "A Precipitated Starch Product", by C. C. Kessler and W. C. Black, presented at the Annual Meeting of the Technical Association of the Pulp and Paper Industry, Feb. 16–19, 1942. In the paper, Kessler and Black disclose paper machine trials where a starch-soap complex was added to a papermaking furnish and completely precipitated by aluminum ions in intimate association with the fibers of a papermaking furnish. The use of the product in papermaking is described as providing high starch retention.

In the present invention, the starch-soap complex is precipitated on the surfaces of an inorganic pigment, preferably a calcium carbonate pigment. The process can be carried out by precipitating the starch-soap complex directly onto the pigment before the treated pigment is introduced into a papermaking furnish, or the starch-soap complex may be prepared first, precipitated, and then introduced into a papermaking furnish containing the pigment. In the preferred method, the pigment is surface treated prior to incorporation into a papermaking furnish to achieve optimum sizing efficiency. Since starch is chemically similar to cellulose, it is postulated that once the starch-soap complex precipitates and becomes anchored on pigment surfaces, permanent covalent bonds between the sizing material and the starch hydroxyl groups associated with the treated pigment are formed. This ability to form permanent covalent bonds with starch hydroxyl groups as well as the hydroxyl groups associated with cellulose fibers, increases the proportion of size which has reacted either with cellulose or starch in the paper web, thereby increasing the ultimate water repellency of the papers. Thus, the size becomes permanently anchored on both the cellulose fibers and the treated filler component of the paper web.

This modification of the pigment component of the papermaking furnish permits the use of higher than normal filler loadings in coated and uncoated fine papers, bleached board products, and other paper grades that contain filler. The potential benefits from the use of the modified pigment include improved smoothness and print quality, reduced fiber and size usage, as well as the possible elimination of cationic starch addition to the wet end.

DETAILED DESCRIPTION

The process for making the treated pigment of the present invention is illustrated schematically in the FIGURE of drawing. The initial step involves conventional cooking of a corn or potato starch either in a batch cook or continuously in a starch jet cooker. Unmodified corn or potato starches are preferred although modified starches such as oxidized starches can also be used.

The second step in the process involves physically mixing the starch solution with the soap component comprising, sodium or potassium salts of fatty acids, in concentrations ranging from about 1% to about 10%. The complexed starch products produced will totally precipitate when sufficient calcium, magnesium or aluminum ions are introduced into unmodified starch solutions, and will be partially precipitated with the use of a modified starch. The addition of divalent or trivalent calcium or aluminum ions will form an insoluble soap and a precipitate of the complex.

The third step in the process involves metering between about 1.5 and 30.0 parts of the starch-soap complex per 100 parts pigment into a pigment slurry under moderate rates of shear, or into a pigment-containing papermaking furnish under shear. When mixed with a precipitated calcium carbonate slurry, or a papermaking furnish containing precipitated calcium carbonate, sufficient calcium ions are present to completely precipitate the complexed starch products onto the pigment surfaces. Precipitation of the complexed starch is virtually instantaneous.

In order to test the theory of the present invention, a treated pigment was prepared as follows. A standard pearl corn starch supplied by A. E. Staley was batched cooked at 2.0% solids for 20 minutes at 95°–98° C. After completion of the cook, 3.0% soap flakes were added to the starch paste at 90° C. while mixing with a magnetic stir bar. The fatty acid composition of the soap is summarized in Table 1.

TABLE 1

| Acid | Percent |
|---|---|
| Myristic ($C_{14}$) | 0.11 |
| Palmitic ($C_{16}$) | 25.98 |
| Palmitoleic ($C_{16}$) | 7.42 |
| Stearic ($C_{18}$) | 16.72 |
| Oleic ($C_{18}$) | 38.48 |
| Shorter than ($C_{14}$) | 5.73 |

The soap flakes were mostly a mixture of $C_{16}$ to $C_{18}$ fatty acids. The predominant fatty acid component was oleic acid followed by palmitic and stearic acids.

After the temperature had dropped to about 80° C., variable concentrations of the complexed starch product were metered into separate batches of a 20% solids ALBACAR HO calcium carbonate pigment slurry supplied by Specialty Minerals, Inc., to produce a surface treated pigment according to the preferred method of the invention. This particular PCC pigment displayed a scalenohedral morphology with an average particle diameter of about 1.6 microns.

The following examples illustrate the sizing benefits obtainable with the use of the surface treated pigment described hereinbefore.

EXAMPLE I

Surface treated pigments having complexed starch concentrations ranging from zero (a control), up to about 7.50 parts per 100 parts pigment were incorporated into an 80% hardwood/20% softwood bleached kraft fiber furnish. The complexed starch contained 3.0% soluble soap as described hereinbefore. Furnish additives included 12.0 lb/ton Cato 232 cationic starch, 3.0 lb/ton Keydime E alkyl ketene dimer size, 5.0 lb/ton aluminum sulfate and 0.5 lb/ton Reten 1523H anionic polyacrylamide retention aid. Handsheets were prepared at a target 50 lb/ream basis weight (ream size 3,300 sq. ft.). The handsheets were dried at 240° F. and conditioned for 1.5 hours prior to initial water repellency testing. HST sizing tests were also completed 4 weeks after manufacture to determine the extent of size reversion. Table 2 summarizes the sizing results.

TABLE 2

| Starch/100 parts Pigment | PCC % | HST Sizing (sec.) | |
|---|---|---|---|
| | | Initial | 4 wks. |
| Control | 26.6 | 41 | 15 |
| 1.50 | 27.3 | 225 | 106 |
| 3.75 | 26.9 | 428 | 379 |
| 7.50 | 26.5 | 439 | 473 |

The benefits associated with pigment treatment on sizing are apparent. As the concentration of complexed starch on pigment was increased to about 7.50 parts per 100 parts pigment, the initial sizing values increased from 41 to seconds at a constant 3.0 lb/ton addition of AKD size. Size reversion also decreased with increasing concentrations of complexed starch. Meanwhile, the dry strength properties of handsheets made from the furnish with surface treated pigment also increased without adversely affecting the optical properties of the paper.

EXAMPLE II

In a second experiment, the concentration of the complexed starch used in Example I was increased to about 30.0 parts/100 parts pigment. This pigment was incorporated into handsheets as outlined above in Example I, except that the Reten 1523H concentration was increased to 0.75 lb/ton. Table 3 summarizes the sizing results.

TABLE 3

| Starch/100 parts Pigment | PCC % | HST Sizing (sec.) Initial | 4 wks. |
|---|---|---|---|
| Control | 16.4 | 96 | 40 |
| 30.0 | 17.2 | 244 | 244 |
| Control | 22.8 | 6 | 1 |
| 30.0 | 23.6 | 288 | 253 |

Two concentrations were evaluated, a control with untreated pigment, and a sample containing pigment treated with 30.0 parts starch/100 parts pigment. Enhanced sizing and essentially no size reversion were achieved with the use of the surface treated pigment. The high concentration of complexed starch on pigment resulted in large increases in the internal bond of the handsheets.

EXAMPLE III

In a third experiment, target filler loadings of from about 15–50% were evaluated to determine the effect of the surface treated pigment on sizing efficiency. Furnish conditions were the same as the previous study described above except for the use of a treated pigment reacted with a starch-soap complex prepared with 5.0% soluble soap. Each condition contained 7.50 parts complexed starch/100 parts pigment. The results of the HST sizing test are shown in Table 4.

TABLE 4

| Condition | PCC % | HST Sizing (Sec.) Initial | 4 wks. |
|---|---|---|---|
| Control | 15.3 | 281 | 217 |
| Treated | 16.3 | 387 | 354 |
| Control | 19.9 | 131 | 22 |
| Treated | 21.5 | 439 | 453 |
| Control | 26.3 | 3 | 1 |
| Treated | 25.8 | 614 | 677 |
| Control | 35.2 | 1 | 0 |
| Treated | 34.4 | 640 | 579 |
| Control | 50.6 | 0 | 0 |
| Treated | 48.0 | 243 | 336 |

With the untreated control pigment, initial sizing values decreased from 281 to 3 seconds as filler loadings increased from about 15% to 26%. This was not unexpected, since reductions in sizing with increased filler loadings and the significant loss of sizing over time, is typical for PCC pigments in commercial applications. However, with the surface treated pigment, initial sizing values increased from 387 to 640 seconds as filler loadings increased from 16–34%. Even at the 48% filler level, substantial water repellency was achieved without increasing the concentration of the sizing agent. With the treated pigment, sizing was also stable over time as shown by the 4 week measurements. This is a result of the present invention that was unexpected, since generally higher levels of sizing agent are required to maintain equivalent HST size values as filler loadings are increased.

EXAMPLE IV

Table 5 summarizes the impact of the soluble soap component of the starch-soap complex on HST sizing values. For this example, the furnish components were identical to those outlined in Example III and the treated pigment contained 7.50 parts starch/100 parts complexed pigment.

TABLE 5

| Soap on Starch % | PCC % | HST Sizing (Sec.) Initial | 4 wks. |
|---|---|---|---|
| Control (0.0) | 27.0 | 370 | 381 |
| 5.0 | 25.8 | 614 | 677 |
| 10.0 | 26.8 | 604 | 615 |

An initial sizing value of 370 seconds was achieved with the control when 7.5 parts of non-complexed pearl corn starch was added to the PCC pigment. This occurred because pearl corn starch will partially precipitate in the presence of soluble calcium ions while a portion of the starch remains in solution. Nevertheless, the addition of 5.0% and 10.0% of the soluble soap to the cooked starch showed a substantial increase in sizing benefits. At the 5.0% level of soap addition, essentially all of the starch precipitated on the pigment surfaces.

EXAMPLE V

Data comparing unmodified pearl corn starch and potato starches are shown in Table 6.

TABLE 6

| Starch Type | Starch/100 Parts Pigment | PCC % | HST Sizing (Sec.) Initial | 4 wks. |
|---|---|---|---|---|
| Control | 0.0 | 15.3 | 264 | 201 |
| Corn | 15.0 | 17.2 | 428 | 405 |
| Potato | 15.0 | 16.1 | 407 | 362 |
| Control | 0.0 | 26.7 | 13 | 6 |
| Corn | 15.0 | 24.9 | 564 | 520 |
| Potato | 15.0 | 24.1 | 390 | 140 |

In this experiment, each starch product was cooked at 1.0% solids. Exactly 3.0% soluble soap was added to each starch paste following the same procedure previously outlined. Fifteen parts complexed starch was added to each 100 parts pigment. Furnish and wet end additive concentrations were identical to those in the experiment summarized in Table 2. In this comparison, both starches outperformed the untreated control although the corn starch produced superior initial sizing values and better sizing stability over time.

At target filler loadings of about 25%, using 3.0 lb/ton AKD size, initial sizing values with an untreated PCC pigment ranged between about 3 and 41 seconds. With the surface treated pigment according to the present invention, at the same AKD concentration, sizing values were an order of magnitude higher. Furthermore, at filler levels as high as 48%, good sizing values and no reversion was measured with no increase in the concentration of sizing agent.

EXAMPLE VI

The study summarized in Table 7 shows the results of an investigation of the impact of reducing the AKD concentration on HST sizing while using a surface treated pigment in accordance with the present invention. This is significant since lower concentrations of sizing agents could reduce machine deposits in commercial applications. Furnish and wet end additive concentrations are identical to those outlined in connection with Example I, and the PCC pigment was surface treated with 7.50 parts starch/100 parts complexed pigment. The complexed starch contained 3.0% soluble soap.

TABLE 7

| AKD Conc. | PCC | HST Sizing (secs.) | |
|---|---|---|---|
| lb/ton | % | Initial | 4 wks. |
| 1.0 | 27.4 | 1 | — |
| 1.5 | 25.4 | 11 | 8 |
| 2.0 | 26.3 | 427 | 369 |
| 3.0 | 26.0 | 644 | 583 |

The data in Table 7 indicate that a 33% reduction in AKD size produced an initial HST sizing value of 427 seconds. Moreover, the sizing value remained substantially stable after four weeks (369 seconds). This experiment demonstrated that good water repellency with reduced use of internal size can be achieved with the surface treated pigments of the present invention.

EXAMPLE VII

In another experiment, a rhombohedral pigment, ALBAGLOS S, supplied by Specialty Minerals Inc., was evaluated. This pigment displayed a mean particle diameter of 0.5 microns. Untreated and surface treated pigments were compared in a handsheet study with target filler loadings of 5–25%. Pearl corn starch from A. E. Staley was complexed with 3.0% soluble soap. Furnish and wet end additives were identical to those outlined in previous experiments. The data are summarized in Table 8.

TABLE 8

| Pigment | PCC | HST Sizing (secs.) | |
|---|---|---|---|
| Treatment | % | Initial | 4 wks. |
| No | 5.4 | 326 | 296 |
| Yes | 5.5 | 334 | 300 |
| No | 11.0 | 222 | 194 |
| Yes | 10.9 | 280 | 270 |
| No | 16.4 | 85 | 53 |
| Yes | 15.5 | 326 | 301 |
| No | 22.0 | 9 | 7 |
| Yes | 19.4 | 347 | 327 |
| No | 27.7 | 1 | 0 |
| Yes | 26.1 | 307 | 290 |

With the surface treated pigment, constant initial sizing values were substantially maintained over the entire range of filler loadings. As expected, the handsheets containing the control pigment showed systematic decreases in HST sizing as filler levels increased. Dry strength properties were also significantly higher for handsheets containing the surface treated pigment.

EXAMPLE VIII

In this study, an ultra fine ground calcium carbonate pigment (OMYAFIL), supplied by the Omya Corporation, was evaluated. This pigment had a mean particle diameter of 0.7 microns. The unmodified pearl corn starch was complexed with 3.0% soap flakes. Exactly 7.50 parts complexed starch were added to 100 parts pigment following the procedure outlined in previous examples. Significant sizing benefits versus the untreated controls were achieved and are summarized in Table 9.

TABLE 9

| Condition | PCC % | HST Sizing (secs.) | |
|---|---|---|---|
| | | Initial | 4 wks. |
| Control | 16.2 | 170 | 137 |
| Treated | 16.2 | 239 | 250 |
| Control | 21.9 | 51 | 20 |
| Treated | 21.3 | 211 | 191 |
| Control | 27.4 | 1 | 1 |
| Treated | 26.4 | 188 | 185 |

In summary, the novel features of the surface treated pigments of the present invention include enhanced sizing efficiency and reduced size reversion as filler loadings increase without the necessity of adding higher concentrations of size. This result is contrary to any known effect in conventional papermaking furnishes. The invention also substantially eliminates the size reversion problems associated with precipitated calcium carbonate pigments. Finally, the invention provides the ability to effectively size papers containing PCC pigments when filler loadings are higher than about 20%, while still retaining dry strength properties.

The invention has been described in detail in connection with the use of precipitated calcium carbonate pigments. However, those skilled in the art will appreciate that the surface treatment described herein is readily adaptable to ground calcium carbonate or other inorganic pigments capable of being reacted with the starch-soap complex of the invention. The use of the invention with PCC is significant because of the current shift to alkaline papermaking processes which use satellite PCC pigment manufacturing processes. The present invention is readily adaptable to such satellite manufacturing processes.

Accordingly, while the invention has been fully described, many changes and variations in the use of the treated pigments may be made by those skilled in the art within the context of the claims annexed hereto.

What is claimed is:

1. A process of incorporating an inorganic calcium carbonate filler material into a fibrous material which comprises reacting an aqueous slurry of the filler material with between about 1.5–30.0 parts of a starch-soap complex per 100 parts filler, wherein the starch component is an oxidized starch or an unmodified starch, either before or after the introduction of the filler material into a furnish of the fibrous material to precipitate the starch-soap complex on the surfaces of the filler material.

2. The process of claim 1 wherein the fibrous furnish comprises a papermaking furnish consisting primarily of cellulose fibers.

3. The process of claim 2 wherein the soap component contains primarily $C_{16}$ to $C_{18}$ fatty acids from the group consisting of oleic, stearic and palmitic acids.

4. The process of claim 3 wherein the calcium carbonate is selected from the group consisting of ground and precipitated calcium carbonate.

5. The process of claim 4 wherein the calcium carbonate is precipitated calcium carbonate.

6. A method of forming paper having good filler retention and dry strength with little or no size reversion comprising; adding to a papermaking slurry consisting essentially of cellulose fibers, an inorganic calcium carbonate pigment which is surface treated with between about 1.5–30.0 parts of a starch-soap complex per 100 parts pigment, wherein the starch component is an oxidized starch or an unmodified starch, and a size component for imparting enhanced water repellency to the finished paper.

7. The method of claim 6 wherein the size component is selected from the group consisting of alkyl ketene dimer and alkenyl succinic anhydride.

8. The method of claim 7 wherein the starch component comprises corn or potato starch and the soap component comprises a soluble soap containing primarily $C_{16}$ to $C_{18}$ fatty acids from the group consisting of oleic, stearic and palmitic acids.

9. A papermaking method comprising the steps of sheet formation of an aqueous papermaking stock which contains cellulose fibers and an inorganic calcium carbonate filler, dewatering and drying, characterized by the addition to the filler of between about 1.5–30.0 parts of a starch-soap complex per 100 parts filler, wherein the starch component is an oxidized starch or an unmodified starch, precipitated on the surfaces of the filler, and a sizing material for imparting enhanced water repellency to the finished paper, wherein the sizing material forms permanent covalent bonds with the starch hydroxyl groups of the starch-soap complex to provide little or no size reversion over time.

10. A method for improving a papermaking process by reducing the amount of sizing required and maintaining sizing over time while increasing filler content without sacrificing dry strength properties comprising, adding to a papermaking furnish consisting essentially of cellulose fibers from about 5–50% of an inorganic calcium carbonate filler material which has been surface treated with from about 1.5 to 30.0 parts per 100 parts filler with a starch-soap complex, wherein the starch component is an oxidized starch or an unmodified starch, and from about 1.0 to about 5.0 lb/ton of a sizing material for imparting enhanced water repellency to the finished paper.

11. The method of claim 10 wherein the starch-soap complex comprises a mixture of corn and potato starches complexed with a soluble soap of $C_{16}$ to $C_{18}$ fatty acids consisting essentially of oleic, stearic and palmitic acids, which is precipitated on the surfaces of the filler material in the presence of divalent and trivalent ions.

12. The method of claim 11 wherein the calcium carbonate filler material is selected from the group consisting of ground and precipitated calcium carbonate.

* * * * *